(12) United States Patent
Juliussen et al.

(10) Patent No.: US 11,981,488 B2
(45) Date of Patent: May 14, 2024

(54) BIODEGRADABLE CONTAINER

(71) Applicant: Toraphene Limited, London (GB)

(72) Inventors: Gaute Juliussen, London (GB); Simon Broughton, London (GB)

( * ) Notice: Subject to any disclaimer, the term of this patent is extended or adjusted under 35 U.S.C. 154(b) by 0 days.

(21) Appl. No.: 17/777,009

(22) PCT Filed: Nov. 16, 2020

(86) PCT No.: PCT/IB2020/060746
§ 371 (c)(1),
(2) Date: May 13, 2022

(87) PCT Pub. No.: WO2021/095022
PCT Pub. Date: May 20, 2021

(65) Prior Publication Data
US 2022/0396405 A1 Dec. 15, 2022

(30) Foreign Application Priority Data

Nov. 15, 2019 (GB) ..................... 1916692

(51) Int. Cl.
*B65D 65/46* (2006.01)
*D21H 25/06* (2006.01)
*D21H 27/10* (2006.01)

(52) U.S. Cl.
CPC ........... *B65D 65/466* (2013.01); *D21H 25/06* (2013.01); *D21H 27/10* (2013.01); *B65D 2565/382* (2013.01); *B65D 2565/387* (2013.01)

(58) Field of Classification Search
None
See application file for complete search history.

(56) References Cited

U.S. PATENT DOCUMENTS

| 2012/0277360 | A1* | 11/2012 | Scheffer | C08K 3/04 524/237 |
| 2017/0106342 | A1* | 4/2017 | Raveendran-Nair | B01D 71/024 |
| 2018/0186954 | A1* | 7/2018 | Zheng | C08J 3/24 |
| 2018/0212209 | A1* | 7/2018 | Lee | H01M 50/124 |
| 2020/0168356 | A1* | 5/2020 | Lin | H01B 13/0016 |
| 2020/0362137 | A1* | 11/2020 | Nosker | B32B 27/308 |

FOREIGN PATENT DOCUMENTS

| CN | 205131948 U | | 4/2016 | |
| EP | 3812148 A1 | * | 4/2021 | ............ B32B 15/08 |
| JP | 2021006598 A | * | 1/2021 | |
| WO | 2012061482 A1 | | 5/2012 | |

OTHER PUBLICATIONS

Qi, X.; Yan, W.; Cao, Z.; Ding, M.; Yuan, Y. Current Advances in the Biodegradation and Bioconversion of Polyethylene Terephthalate. Microorganisms 2022, 10, 39 (Year: 2022).*
Combined Search and Examination Report under sections 17 and 18(3) issued in GB Application No. GB1916692.5 dated Apr. 14, 2020, 5 pages.
International Search Report with Written Opinion issued in International Patent Application No. PCT/IB2020/060746 dated Mar. 5, 2021, 8 pages.

* cited by examiner

*Primary Examiner* — Lee E Sanderson
(74) *Attorney, Agent, or Firm* — RC Trademark Company

(57) ABSTRACT

Disclosed is a biodegradable container comprising a biodegradable material and a reinforced barrier film coated onto the biodegradable material, wherein the reinforced barrier film comprises graphene nanoplatelets dispersed in a biodegradable polymeric substrate.

5 Claims, No Drawings

BIODEGRADABLE CONTAINER

TECHNICAL FIELD

The present disclosure relates generally to a biodegradable container, such as a container typically used for foodstuffs.

BACKGROUND

Disposable containers such as cups, plates and bowls are widely used in ready to eat food outlets. Globally, biodegradable materials are widely used to manufacture disposable containers. The biodegradable materials used to manufacture such disposable containers may include, but are not limited to, paper, cardboard, wood or any combination thereof. The biodegradable material contains a barrier film that acts as a barrier between an external environment and food content in the disposable container. In particular, the barrier film provides protection to the food content against factors such as the transmission of moisture, oxygen, contaminants. Furthermore, barrier film on the biodegradable material is required to make the disposable container waterproof and therefore able to contain liquid. Therefore, the choice of a reliable film barrier is very important while serving different types of food products therein to ensure effective storage of food products.

Currently, different types of plastics are indispensably used as a conventional barrier film to manufacture a disposable container. For example, the types of plastic used for making the conventional barrier film for disposable containers may include, but are not limited to, synthetic plastic, biodegradable plastic and metal oxide plastic. However, such types of plastic are very difficult to recycle and therefore, often end up as litter and are dumped in landfills where the disposable containers break down into toxic microplastics causing severe environmental and health problems. For example, the toxic microplastics may include, but are not limited to bisphenol A (BPA), Dichlorodiphenyltrichloroethane (DDT), persistent organic pollutants (POPs) other endocrine disruptors. Further, these toxic microplastics also end up in water bodies such as ocean, river and sea and affect the nutrient uptake of the aquatic animals dwelling therein, and indeed cause more serious harm to aquatic animals.

Moreover, biodegradable and compostable polymers such as polylactic acid (PLA) may be used in replacement of the conventional barrier film. However, the thickness of biodegradable and compostable polymers needed to obtain sufficient barrier properties tends to be too much to be processed by recycling machinery, rendering the containers unrecyclable. Furthermore, biodegradable and compostable polymer made barrier films do not degrade at a fast-enough rate in ambient conditions to avoid accumulation when trying to dispose of them by composting.

SUMMARY

The present disclosure seeks to provide a biodegradable container that is also recyclable using existing infrastructure.

The present disclosure seeks to provide a solution to the existing problems described above and associated with non-biodegradable barrier films on biodegradable materials. An aim of the present disclosure is to provide a solution that overcomes at least partially the problems encountered in prior art, and to provide an improved biodegradable barrier film for the biodegradable material, thereby facilitating an environment-friendly disposable container that also can be recycled using existing infrastructure.

In one aspect, an embodiment of the present disclosure provides a biodegradable container comprising a biodegradable material and a reinforced barrier film coated onto the biodegradable material, wherein the reinforced barrier film comprises graphene nanoplatelets dispersed in a biodegradable polymeric substrate.

Optionally, the polymeric substrate is less than 3 percent of the total weight of the biodegradable material.

Optionally, the graphene nanoplatelets comprise at least one of: graphene, functionalized graphene, doped graphene, graphene oxide, partially reduced graphene oxide, graphite flakes.

Optionally, the biodegradable container is a cup, plate, bowl, box, bag or bottle.

Optionally, the thickness of coating of the reinforced barrier film is in a range of 5 micrometres to 50 micrometres Optionally, the biodegradable material is at least one of: paper, cellulose, wood, biodegradable plastic.

Additional aspects, advantages, features and objects of the present disclosure would be made apparent from the detailed description of the illustrative embodiments construed in conjunction with the appended claims that follow.

It will be appreciated that features of the present disclosure are susceptible to being combined in various combinations without departing from the scope of the present disclosure as defined by the appended claims.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides the aforementioned reinforced barrier film which provides a coating on the biodegradable material to provide the disclosed biodegradable container. The disclosed reinforced barrier film is a highly efficient biodegradable coating that provides an excellent alternative to a conventional plastic coating that is non-biodegradable, hence making the disclosed reinforced barrier film non-polluting and environmentally friendly. This is achieved by dispersing the graphene nanoplatelets in the polymeric substrate that provides a stable and strong coating while reducing the content of the polymeric substrate. Further, the reinforced barrier film strengthens the biodegradable material to hold any liquid content such as tea, water, coffee and the alike without leaking and it considerably improves the thermal resistance protecting the container against breaking down and contaminating the contents especially when heated food or drink is contained. Beneficially, the thickness of the reinforced barrier film is reduced considerably, and the risk of contaminating contents is greatly reduced when compared with conventional plastic coating.

The present disclosure provides the reinforced barrier film. Throughout the present disclosure, the term "reinforced barrier film" refers to an artificially-made thin layer providing barrier properties. Herein, barrier properties refer to an ability of: (a) providing a leak-proof coating on containers (for example, cups, plates, bowls, boxes, bags and bottles) for storing any liquid or food containing moisture such as water, tea, coffee, soup, fish & chips and the alike without chemically interacting with the stored liquid or food; and/or (b) enhancing strength of the containers without increasing the thickness of the containers; and/or (c) protecting the container against thermal degradation and resulting contamination of (high temperature) contents. For example, the reinforced barrier film may be coated on closed bottom and inner side surfaces of a disposable paper container.

The reinforced barrier film comprises graphene nanoplatelets. In the present disclosure, the term "graphene nanoplatelets" refers to short stacks of polygonal platelet-shaped graphene sheets in a planar structure. Due to a unique size and morphology, the graphene nanoplatelets possess enhanced barrier properties and excellent mechanical properties such as toughness, strength, and surface hardness. In an embodiment, each of the graphene nanoplatelets has at least 2 graphene layers (monolayers). Further, each of the graphene nanoplatelets has a diameter in the range of approximately 0.5 micrometres to 15 micrometres. The easier movement or the easier turning of the graphene nanoplatelets is beneficial for example in a process for forming continuous (or approximately continuous) sheet.

In an embodiment, each of the graphene nanoplatelets has a thickness in a range of 5-10 nanometres and a diameter in a range of 1-50 micrometres. In an example, the thickness may be from 5, 6, 7, 8 or 9 nanometres up to 6, 7, 8, 9 or 10 nanometres. In an example, the diameter may be from 1, 5, 10, 15, 20, 25, 30, 35, 40 or 45 micrometres up to 5, 10, 15, 20, 25, 30, 35, 40, 45 or 50 micrometres.

In an embodiment, the synthetic barrier material has a graphene nanoplatelets content in the range of 0.1% to 5% by weight. For example, the content of the graphene nanoplatelets in the synthetic barrier material is 0.5% by weight. It will be appreciated that the appropriate percentage by weight of the graphene nanoplatelets is added in the reinforced barrier film to helps the reinforced barrier film achieve mechanical strength.

In an embodiment, graphene nanoplatelets comprise at least one of: graphene, functionalized graphene, doped graphene, graphene oxide, partially reduced graphene oxide, graphite flakes. In the present disclosure, the term "graphene" refers to a planar sheet formed with sp2 hybridization of carbon atoms, an atomic layer thickness of only a quasi-two-dimensional material, also called a single atomic layer of graphite. Optionally, the graphene may be synthesised by one of the synthesis techniques: mechanical cleaving, chemical exfoliation, chemical synthesis or chemical vapour deposition. In an example, the synthesis technique employed to synthesise graphene may be mechanical cleaving. In such an example, graphite or graphite oxide is mechanically exfoliated to obtain graphene sheets. In another example, the graphene may be synthesized by chemical vapour deposition. In such example, methane and hydrogen are reacted on a metal surface at high temperatures to deposit sheets of graphene thereon. In yet another example, chemical synthesis may be employed to obtain graphene by synthesizing graphene and subsequently reducing with hydrazine. Furthermore, the properties and structure of graphene may depend on the technique employed for synthesis. Additionally, the chemical vapour deposition technique may be employed to obtain graphene sheets with the least amount of impurities.

Optionally, graphene nanoplatelets may include functionalised graphene. More optionally, the functionalized graphene may include at least one of a functional group selected from the following group: aliphatic ester, aromatic ester, amine, epoxide, carboxyl, hydroxyl, siloxanes, silanes. Furthermore, the synthesized graphene may be reacted with a suitable compound to obtain functionalised graphene.

Optionally, graphene could be non-covalently functionalised by mixing graphene with organic molecules such as polymers. In an example, a water solution processing method can be used for the preparation of polyvinyl alcohol (PVA) nanocomposites with graphene oxide (GO). Optionally, each of the carbon atoms in the synthesised graphene comprises a delocalised electron. Consequently, the functional group may react with the carbon atoms thereof. In an example, the functionalised graphene may include functional groups, epoxide and carboxylic acid. In addition, the functional groups of the functionalised graphene may influence the properties thereof. Furthermore, the functional groups of the functionalised graphene may enhance the strength of the reinforced barrier film and adhesion of the reinforced barrier film on the surface of the containers.

Optionally, graphene nanoplatelets may include doped graphene. Specifically, synthesised graphene may be doped with an element to enhance properties of the synthesised graphene. Examples of the element may include, but are not limited to, boron, sulphur, nitrogen, silicon. Optionally, graphene may be doped by employing a doping technique such as heteroatom doping, chemical modification, arc discharge and so forth.

Optionally, graphene may be doped with nitrogen by employing chemical modification. Specifically, graphene may be chemically modified by nitrogen-containing compounds such as nitrogen dioxide, ammonia and so forth. More optionally, graphene doped with an element may be obtained by employing arc discharge of graphite electrodes in the presence of a gas and a compound containing the element to be doped. In an example, boron-doped graphene may be obtained by arc discharge of graphite electrodes in the presence of a gas such as hydrogen or helium, and a compound containing boron such as diborane. In another example, nitrogen-doped graphene may be obtained by arc discharge of graphite electrodes in the presence of a gas such as hydrogen or helium, and a compound containing nitrogen such as ammonia or pyridine. It will be appreciated that the reinforced barrier film comprising doped graphene may exhibit superior adhesion properties. Superior adhesion properties may be achieved by interactions such as Van der Waals interactions, Pi-interactions and so forth.

Optionally, graphene nanoplatelets may include graphene oxide. More optionally, depositing the at least one layer of graphene may include arranging for the at least one layer of graphene to include graphene oxide. Specifically, graphene oxide may be arranged by the exfoliation of graphite oxide. More specifically, the graphite may be oxidized by reaction with strong oxidising agents such as sulphuric acid, potassium permanganate and sodium nitrate. Specifically, the oxidised graphite further increases inter-planar spacing between layers of graphene in graphite oxide.

Optionally, the at least one layer of graphene may be a combination of oxidised and non-oxidised graphene flakes. In one example, exfoliated graphene flakes may be mixed with graphene oxide flakes, improve adhesion performance of the reinforced barrier film. In one example, the ratio between graphene and graphene oxide within the at least one layer of graphene could be 1:1.

Optionally, graphene nanoplatelets may include partially reduced graphene oxide. Specifically, depositing the at least one layer of graphene may include reducing the at least one layer of graphene oxide. Specifically, reduction of graphene oxide may be arranged by employing chemical, electrochemical or thermal means. In an example, the reduction of graphene oxide may be arranged by employing chemical means. In such an example, graphene oxide may be heated in distilled water at high temperatures. Alternatively, in such example, graphene oxide may be reacted with a reducing agent such as urea, hydrazine, ascorbic acid or others. In another example, the reduction of graphene oxide may be arranged by employing thermal means. In such an example, graphene oxide may be reduced at high temperatures in a range of 1000°-1200° Celsius. In another example, graphene oxide may be partially reduced upon heating at milder temperatures in a range of 150°-300° Celsius. In an example, the reduction could occur in a controlled atmosphere, either in vacuum or in inert gas. Consequently, the thermal reduction of graphene oxide may increase mechanical stability and interactabilility of the reinforced barrier film.

Optionally, graphene nanoplatelets may include graphite flakes. Optionally, the graphite flakes may be a combination of oxidised and non-oxidised graphene flakes. In one example, exfoliated graphene flakes may be mixed with the graphene oxide flakes to improve adhesion to the particles of diamond and improved adhesive performance of the paste. In one example, the ratio between graphene and graphene oxide within the graphene nanoplatelets could be 1:1.

The graphene nanoplatelets are dispersed in a polymeric substrate. In the present disclosure, the term "polymeric substrate" refers to a large molecule, or macromolecule, composed of many repeated subunits (namely, monomers). The repeating subunits are made of at least one of carbon, hydrogen, oxygen, nitrogen, sulphur, chlorine, fluorine, phosphorous and silicon. The polymeric substrate may be a three-dimensional network, two-dimensional network or a one-dimensional network. The repeated subunits are linked or chained together chemically by polymerization. The polymerization is the process of connecting the repeating subunits together and creating large macromolecules of different sizes and shapes.

Optionally, the polymeric substrate used may occur naturally. For example, the natural polymeric substrate may include, but is not limited to silk, wool, cellulose and proteins.

Optionally, the polymeric substrate is at least one of: a natural polymer, a synthetic polymer. More optionally, natural polymers include biodegradable polymers, for example, cellulose, hemp, shellac, chitosan, amber, wool, silk, natural rubber, Polybutylene succinate (PBS), and natural polyesters (such as, Polyhydroxyalkanoates (PHA), Polyhydroxybutyrate (PHB), Poly(3-hydroxybutyrate-co-3-hydroxyvalerate) (PHBV)). Moreover, synthetic polymers include, for example, Polyethylene (PE), Polypropylene (PP), Polystyrene (PS), Polyethylene terephthalate (PET), Polyvinyl butyral (PVB), Synthetic Rubber, Neoprene, Nylon, Silicone, and synthetic polyesters (for example, Polylactic acid (PLA)).

Pursuant to embodiments of the present disclosure, the polymeric substrate is a matrix of biodegradable polymer. It will be appreciated that the matrix of biodegradable polymer breaks down after its intended purpose by, for example, bacterial decomposition process, to result in natural by-products, such as, gases ($CO_2$, $N_2$), water, biomass, and inorganic salts. The matrix of biodegradable polymer is naturally occurring or synthetically made. Optionally, the matrix of biodegradable polymer consists of functional groups, for example, ester, amide and ether. In an example, the matrix of biodegradable polymer is composed of Polyhydroxyalkanoate (PHA) polymers, such as, PHB, PHBV, and so forth.

In an example, the matrix of biodegradable polymer is composed of Polylactic acid (PLA). In another example, the matrix of biodegradable polymer is composed of Polyhydroxybutyrate (PHB). In an example, the reinforced barrier film has the polymeric substrate content in the range 98%-99.9%, for example, 99.5%. In an exemplary implementation, the content of the polymeric substrate is 99.5% by weight and the graphene nanoplatelets have content of 0.5% by weight in the reinforced barrier film.

The graphene nanoplatelets are dispersed in the polymeric substrate using the process of dispersion. Beneficially, the graphene nanoplatelets are dispersed in the polymeric substrate in order to produce a uniform and fine distribution of graphene in the polymeric substrate. Furthermore, dispersion of the graphene nanoplatelets in the polymeric substrate enhances stability, strength and adhesive power of the reinforced barrier film. Moreover, dispersion of the graphene nanoplatelets in the polymeric substrate enhances the strength of the polymeric substrate, thus enabling reduction in the thickness of reinforced barrier film and minimizing requirement of the polymeric substrate, thus making the reinforced barrier film biodegradable. Furthermore, dispersion also increases adhesive power of the reinforced barrier film. In one example, exfoliated graphene flakes mixed with the graphene oxide flakes, when dispersed in water, adhesive performance of the exfoliated graphene flakes improves.

The dispersion may be facilitated by incorporating a dispersing medium with the graphene nanoplatelets and the polymeric substrate. The dispersion medium is a synthetic compound that provides external and continuous phase of dispersion for the graphene nanoplatelets in the polymeric substrate. The dispersion media may be liquids, solids, and so forth. Liquid dispersion media may be solvents, mixtures of solvents, any other substance, composition, compound, and so forth, which exhibits liquid properties at room or elevated temperatures. Examples of liquid dispersion media may include, but are not limited to polyethylene glycol ether, castor oil, vegetable wax and water. Solid dispersion media may be at least one of: polymers (such as a solid or melted polymer, namely polymer melt), glasses, metals, metal oxides and so forth.

Optionally, an ultrasonication method may be used to disperse the graphene nanoplatelets in the polymeric substrate. In the ultrasonication method, ultrasound energy is applied to agitate the graphene nanoplatelets and polymeric substrate in the dispersing medium. When ultrasound propagates via a series of compression, attenuated waves are induced in the molecules of the dispersing medium. Such shock waves promote the 'peeling off' of the outer part of the graphene nanoplatelets and thus producing the separation of individualized graphene nanoparticle. The ultrasonication method is an effective method to disperse and exfoliate graphene and obtain stable suspensions in various dispersing medium with low viscosity, such as water, acetone and ethanol. It should be noted that both of frequency of ultrasound (most commonly used zone: 10-50 kHz) and treatment time are crucial parameters for the integrity of graphene structure and its dispersion state in polymer.

Optionally, a calendering method (for example, three-roll mill method) may be used to disperse the graphene nanoplatelets in the polymeric substrate. In three-roll mill method, shear force is employed by rollers to disperse the graphene nanoplatelets in the polymeric substrate. For instance, three-roll mill consists of three adjacent cylindrical rolls where three rolls turned at the different angular velocity ratio. The first and third rolls rotated in the same direction while the centre roll rotated oppositely. Adjusting the gap distance and nip force between rolls resulted in high shearing stress, which could break up the nanoparticle agglomerates and hence generate highly dispersed polymer dispersion. the dispersion state of the graphene nanoplatelets may be tuned by changing the gap between the adjacent rolls. A serial of polymer composites with low loading of reduced graphene oxide (RGO) sheets have been prepared by using the calendering process.

Optionally, an extrusion method may be used to disperse graphene into solid polymers like most thermoplastics. Twin screws in extruder hopper rotate at a high speed generating high shear flow through adjusting various parameters such as screw speed, temperature and time that leads to graphene dispersing and mixed with polymer matrix. The extrusion method meets large-scale production of polymer composites, which has been used for fabricating high-performance graphene-polymer composites.

It will be appreciated that extrusion is a process for creating objects of a fixed cross-sectional profile. Pursuant to embodiments of the present disclosure, extrusion is performed strategically and precisely to create (namely, produce) the biodegradable polymer nanocomposite from the graphene-polymer nanocomposite. In this regard, pellets, powder or flakes of the graphene-polymer nanocomposite are pushed through a shaping tool (for example, a die) of desire cross-section, wherein compressive stress and shear stress acts thereon when it is pushed through the shaping tool. Optionally, the pellets are melted in an extruder to perform extrusion thereon. Subsequently, a cross-linking between molecules of the graphene-polymer nanocomposite may be formed during heating and melting thereto, in the extruder. Beneficially, extruding the graphene-polymer nanocomposite enables production of complex cross-sections of the graphene-polymer nanocomposite, or can be used to lay down a thin film of it.

Optionally, the extrusion is performed using screw and barrel extruder. Herein, the pellets of the graphene-polymer nanocomposite are fed into a barrel of an extruder through a hopper. It will be appreciated that heating elements are placed over the barrel to heat the barrel so as to melt the pellets therein. Moreover, the pellets are then conveyed forward by a rotating screw and forced through a shaping tool or a die. Subsequently, molten pellets of graphene-polymer nanocomposite are converted to continuous biodegradable polymer nanocomposite. Moreover, thermocouples are attached to the barrel to sense and subsequently control a temperature of the barrel thereby controlling a temperature of the molten pellets. Moreover, the continuous biodegradable polymer nanocomposite that is forced through the die is cooled by blown air or water bath.

Optionally, the screw of the extruder has a diameter in a range of 25 millimetres (mm) to 250 millimetres (mm). Moreover, a length to diameter ratio of the extruder is in a range of 15 to 40. Additionally, speed of rotation of the screw is in a range of 20 rotations per minute (RPM) to 150 RPM. Furthermore, optionally, depth of conveying channel of the screw is contoured from large to small in a flow direction of the molten graphene-polymer nanocomposite so as to account for density change of the graphene-polymer nanocomposite from solid state to liquid state and for pressure development.

In an instance, the extruder is a single screw extruder (SSE). In another instance, the extruder is a twin screw extruder (TSE). In such a case, the graphene-polymer nanocomposite is conveyed through the barrel with two screws. Moreover, the two screws of the TSE may be co-rotating intermeshing, counter-rotating intermeshing or counter-rotating non-intermeshing. Optionally, the two screws of the TSE have the same diameter and same speed. Pursuant to embodiments of the present disclosure, twin screw extruder is employed.

More optionally, shear developed in the annulus between a screw and a barrel of the screw and barrel extruder is sufficient to deagglomerate agglomerated graphene nanoplatelets in the matrix of biodegradable polymer. It will be appreciated that mixing the plurality of graphene nanoplatelets with the matrix of biodegradable polymer leads to contact between the plurality of graphene nanoplatelets. Subsequently, the plurality of graphene nanoplatelets tends to agglomerate as they come in contact with each other, owing to Van der Waals static forces acting therebetween. Such agglomeration of the plurality of graphene nanoplatelets turns the plurality of graphene nanoplatelets into graphite that is different and undesirable. Therefore, the extruder is designed in a manner that the extruder allows for maximum shear force in an annulus between screw(s) of the extruder and the barrel thereby ensuring that the plurality of graphene nanoplatelets that may have agglomerated will deagglomerate so that they are in the same form as originally exfoliated graphene, with help of shear force acting on the graphene-polymer nanocomposite, in the extruder.

Additionally, optionally, the extrusion is performed at a temperature in a range of 120 degree Celsius to 160 degree Celsius. It will be appreciated that the barrel of the extruder has heating elements attached thereto. Optionally, the extruder has different heating element for different zones, wherein heating element for a zone may be regulated based on desired temperature for the zone. Subsequently, optionally, the barrel may comprise different temperature zones, wherein each zone has a temperature required for operation in the said zone. Alternatively, optionally, same temperature is maintained throughout the barrel by the heating elements of the extruder. Following extrusion, the biodegradable polymer composite may be cooled, typically to room temperature, to solidify it. This ensures that the structural characteristics are preserved.

In an example, the heating elements heat the barrel to 145 degree Celsius for extrusion of the graphene-polymer nanocomposite. Moreover, the diameter of an extruder used for extruding the graphene-polymer nanocomposite may be 16 mm. Moreover, optionally, to obtain accurate diameter tolerance of extruded graphene-polymer nanocomposite (namely, biodegradable polymer nanocomposite) a tolerance puller and/or a filament winder is employed. Again, the extruded material may be cooled to room temperature.

The reinforced barrier film is coated on a biodegradable material. In the present disclosure, the "biodegradable material" refers to a material that decomposes naturally in nature in a finite duration of time (for example, 1 year) without causing environmental hazards. These biodegradable materials are used to manufacture disposable containers such as plates, cups, boxes and bowls.

According to an embodiment, the biodegradable material is at least one of: paper, cellulose, wood, biodegradable plastic. For example, the paper coated with the reinforced barrier film may be used as a disposable container to store water. In the present disclosure, the cellulose is an organic compound with the formula $(C_6H_{10}O_5)_n$, a polysaccharide consisting of a linear chain of several hundred to many thousands of $\beta(1-4)$ linked D-glucose units. The biodegradable material made of the cellulose may include, but is not limited to paper, cardboard and the like. Further, the reinforced barrier film may also be coated on the wood for making the wood capable to be used as a container to store liquids, including hot liquids without breaking down and contaminating the liquid. In the present disclosure, the "biodegradable plastic" is a biologically synthesized plastics (also called as bioplastics or biobased plastics) produced from natural origins, such as plants, animals, or microorganisms. The reinforced barrier film may be coated on the biodegradable plastic in order to provide strength and reduce the thickness of the container made out of the biodegradable plastic.

Therefore, the reinforced barrier film is coated on the biodegradable material in order to provide strength to the biodegradable material while keeping biodegradability of the biodegradable material. Further, the reinforced barrier film limits the use of non-biodegradable polymeric substrate as coating on the biodegradable material, thus still keeps the containers manufactured with biodegradable material with the reinforced barrier film non-polluting and environmentally friendly.

Optionally, the reinforced barrier film may be coated on the biodegradable material using a dry surface treatment (DST) method. With the dry surface treatment method, the coating and surface smoothening are accomplished in a combined process that employs the electrostatic deposition of dry coating particles onto the substrate, followed by a thermomechanical fusing and fixing phase in a heated roll nip. Furthermore, the dry surface treatment method provides possibilities to adjust the surface properties of the reinforced barrier film.

Optionally, the reinforced barrier film may be coated on the biodegradable material using a dispersion and solvent-based coating method. The dispersion and solvent-based coating method enable production of low coat weights and the use of material that is not extrudable. However, the drawbacks in the dispersion and solvent-based coating methods include an energy-intensive evaporation and drying stage after application as well as handling of media in liquid and gaseous forms.

According to an embodiment, the thickness of coating of the reinforced barrier film is in a range of 5 micrometres to 50 micrometres. For example, the thickness of coating of the reinforced barrier film is 20 micrometres. The thickness of coating of the reinforced barrier film is considerably reduced due to the graphene nanoplatelets dispersed in the polymeric substrate. The percentage of the required polymeric substrate to make a strong and stable reinforced barrier film reduces by the presence of the graphene nanoplatelets dispersed in the polymeric substrate.

According to an embodiment, the polymeric substrate is less than 3 percent of the total weight of the biodegradable material. For example, the percentage of polymeric substrate is 1 percent of the total weight of the biodegradable material. Reduction in the polymeric substrate is achieved by the graphene nanoplatelets dispersed in the polymeric substrate. Beneficially, the graphene nanoplatelets have a larger specific surface area and stronger interface binding force that provides strength to the reinforced barrier film, hence the requirement of the polymeric substrate to form strong reinforced barrier film reduces drastically.

According to an embodiment, the percentage of polymeric substrate in the biodegradable material is less than 3 percent of the total weight of the biodegradable material. Advantageously, the reinforced barrier film is biodegradable. Hence, the biodegradable material with the reinforced barrier film decomposes in the natural environment in the finite time duration and thus, the reinforced barrier film is non-polluting. Furthermore, the biodegradable container may be put through conventional recycling machinery including paper recycling machinery without causing such machinery to clog.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A biodegradable container comprising a biodegradable material and a reinforced barrier film coated onto the biodegradable material, wherein the reinforced barrier film comprises graphene nanoplatelets dispersed in a biodegradable polymeric substrate
wherein the content of the polymeric substrate is 98%-99.9% by weight of the reinforced barrier film,
wherein each of the graphene nanoplatelets has a diameter in the range of approximately 0.5 to 15 micrometres,
wherein the graphene nanoplatelets comprises partially reduced graphene oxide mixed with exfoliated graphene flakes wherein the partially reduced graphene oxide has been obtained by thermal reduction at a temperature range of 150°-300° Celsius,
and
wherein the thickness of coating of the reinforced barrier film is in a range of 5 micrometres to 50 micrometres.

2. The biodegradable container according to claim 1, which is a cup, plate, bowl, box, bag or bottle.

3. The biodegradable container according to claim 1, wherein the biodegradable material is at least one of: paper, cellulose, wood, cotton, hemp, cassava, coconut or rice husk, biodegradable plastic.

4. The biodegradable container according to claim 1, wherein the graphene nanoplatelets further comprise functionalized graphene wherein the functional group is at least one of: aliphatic ester, aromatic ester, amine, epoxide, carboxyl, hydroxyl, siloxanes, silanes.

5. The biodegradable container according to claim 1, wherein the graphene nanoplatelets further comprises doped graphene wherein, doped-graphene is nitrogen-doped or boron-doped.

* * * * *